United States Patent [19]

Spangler et al.

[11] 4,028,755
[45] June 14, 1977

[54] METHOD OF REMOVING WAX MOTH LARVAE FROM INFESTED ENCLOSURES

[75] Inventors: Hayward Gosse Spangler; Norbert Mariner Kauffeld, both of Tucson, Ariz.; Charles Dean Owens, East Falmouth, Mass.

[73] Assignee: The United States of America as represented by the Secretary of Agriculture, Washington, D.C.

[22] Filed: Apr. 30, 1976

[21] Appl. No.: 682,069

[52] U.S. Cl. .................................................. 6/1
[51] Int. Cl.² ........................................ A01K 51/00
[58] Field of Search ................................ 6/1, 12

[56] References Cited

OTHER PUBLICATIONS

A. I and E. R. Root, "The ABC and XYZ of Bee Culture," 1923, pp. 610, 612, 841 & 842.

*Primary Examiner*—Hugh R. Chamblee
*Attorney, Agent, or Firm*—M. Howard Silverstein; David G. McConnell

[57] ABSTRACT

Wax moth larvae are removed from an enclosure infested with the same by a method wherein the enclosure is tapped with a hard object at a frequency and with a force sufficient to cause the larvae to move to the surface of the enclosure. The emerged larvae are then separated from the surface.

4 Claims, No Drawings

METHOD OF REMOVING WAX MOTH LARVAE FROM INFESTED ENCLOSURES

BACKGROUND OF THE INVENTION

The invention relates to and has among its objects the provision of a novel method for rapidly removing wax moth larvae from beehives. Further objects of the invention will be evident from the following description wherein parts and percentages are by weight unless otherwise specified.

The wax moth (*Galleria mellonella*) is a dusty brown moth found around beehives. Its progeny are known colloquially as "wax worms." The moth enters the hive at night and deposits its eggs inside, usually in crevices and the like. The eggs hatch into larvae, which feed on the wax in the hive, making silk-lined tunnels in the combs. As a result, the comb becomes ruined. The larvae pupate in tough cocoons within the hive, whence the moths escape to invade new colonies of bees. The "wax worm" also attacks stored beeswax. As a consequence, the wax moth and its larvae are considered to be the most damaging pests to the bee industry.

Beeswax is an extremely important substance. Within the hive it is formed into tiny vaults forming combs wherein the bees store their honey. If the wax is eaten, the honeycomb is destroyed. Furthermore, beeswax has many uses outside the hive. It is employed in lubricants, in salves, in ointments, in harness oils, in phonograph records, in sealing wax, in furniture polishes, in some types of varnishes, as an electrical insulator, in fine candles, and in the production of comb foundations used by apiarists.

Wax moths have been controlled heretofore by a number of methods. For example, fumigation of combs with paradichlorobenzene, ethylene dibromide, calcium cyanide, or ethylene oxide has been used. However, this method of control presents some hazard to humans as well as being sometimes ineffective. Another method of control is freezing the combs to kill the larvae.

SUMMARY OF THE INVENTION

The invention described herein provides means for rapidly removing wax moth larvae from beehives, honeycombs, and other infested areas. The infested enclosure is tapped, whereupon the wax moth larvae emerge to the surface and are easily separated.

One advantage of the invention is that the use of dangerous chemicals is avoided. Thus, hazards to humans due to contamination of honey or beeswax or to contamination of the environment are removed. The method of the invention is safe; not even the wax moth larvae are harmed.

Thus, another advantage of the invention is that the larvae can be recovered in living condition. The recovered larvae may then be used in scientific experiments, for feeding reptilian pets, for fish bait, etc.

A further advantage of the invention is that normal functioning of the bees is not impaired. The bees are not affected by the tapping process if prior to the tapping the infested combs are removed from the hive. Since the combs can be returned immediately to the hives, the production of honey and beeswax is not decreased.

DESCRIPTION OF THE PREFERRED EMBODIMENT

In a practice of the invention the enclosure infested with wax moth larvae is subjected to tapping with a hard object at a regular frequency. Generally, the frequency of taps employed is about from 1–10 taps per second. The force of the tap must be sufficient such that the tap is felt, i.e., radiates, throughout the enclosure. Usually, this force is about 10 inch-ounces. In response to the tapping the wax moth larvae emerge to the surface of the enclosure. At this point many of the emerged larvae fall from the surface of the enclosure; those remaining on the surface may be removed with a bee brush or other suitable device. In any event, it should be obvious that the frequency and force of the taps must be sufficient to cause the wax moth larvae to emerge from the enclosure to its surface.

The so-removed larvae may be collected in the live state and used as described above. If it is desired to kill the larvae, any suitable means, such as application of toxic substance thereto, may be employed.

The invention may be practiced in a number of ways. For example, the tapping may be carried out manually by striking the infested enclosure with a hard object, such as a wooden or metal mallet or the like, at the desired regular intervals. Preferably, the tapping is accomplished mechanically. In this particular embodiment of the invention, a motor driven camming device may be used to cause a tapper or other hard object to strike the infested enclosure at the desired frequency and with the desired force. Other means of practicing the method of the invention will be obvious to those skilled in the art.

It is within the compass of the invention to use the instant method in conjunction with other methods for removing wax moth larvae from infested enclosures.

Having thus described our invention, we claim:

1. A method of removing wax moth larvae from enclosures containing the same, which comprises:
   a. tapping the enclosure with a hard object at a frequency of about from 1 to 10 taps per second and with a force sufficient to cause the larvae to move to the surface of the enclosure, and
   b. removing the larvae from the surface.

2. The method of claim 1 wherein the force of the tap is sufficient such that the tap is felt throughout the enclosure.

3. The method of claim 1 wherein the enclosure is a beehive.

4. The method of claim 1 wherein the enclosure is a frame with a honeycomb contained therein.

* * * * *